(12) United States Patent
Kim et al.

(10) Patent No.: US 11,142,465 B2
(45) Date of Patent: Oct. 12, 2021

(54) COMPOSITE PRECURSOR OF CATHODE ACTIVE MATERIAL, CATHODE ACTIVE MATERIAL, CATHODE AND LITHIUM BATTERY CONTAINING THE CATHODE ACTIVE MATERIAL, AND METHOD OF PREPARING COMPOSITE PRECURSOR

(71) Applicant: Samsung SDI Co., Ltd., Yongin-si (KR)

(72) Inventors: Jin-Hwa Kim, Yongin-si (KR); Do-Hyung Park, Yongin-si (KR); Seon-Young Kwon, Yongin-si (KR); Min-Han Kim, Yongin-si (KR); Jun-Seok Park, Yongin-si (KR); Ji-Hyun Kim, Yongin-si (KR); Kyoung-Hyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 140 days.

(21) Appl. No.: 14/617,812

(22) Filed: Feb. 9, 2015

(65) Prior Publication Data

US 2015/0284259 A1    Oct. 8, 2015

(30) Foreign Application Priority Data

Apr. 4, 2014  (KR) .................. 10-2014-0040742

(51) Int. Cl.
*C01G 51/04* (2006.01)
*H01M 4/525* (2010.01)

(52) U.S. Cl.
CPC ............ *C01G 51/04* (2013.01); *H01M 4/525* (2013.01); *C01P 2002/72* (2013.01);
(Continued)

(58) Field of Classification Search
CPC ................ C01G 51/04; H01M 10/052; H01M 2004/028; H01M 4/525; H01M 4/58;
(Continued)

(56) References Cited

U.S. PATENT DOCUMENTS 7,501,209 B2    3/2009   Suhara et al.
7,585,432 B2    9/2009   Ito et al.
(Continued)

FOREIGN PATENT DOCUMENTS

EP         2314545 A1     4/2011
EP         2 314 545 B    3/2018
(Continued)

OTHER PUBLICATIONS

Pandey et al., Phase coexistence and the structure of the morphotropic phase boundary region in $(1-x)Bi(Mg_{frax;1;2}\ Zr_{frax;1;2})O_3\text{-}xPbTiO_3$ piezoceramics, Indian Institute of Technology, 22 pp. https://arxiv.org/ftp/arxiv/papers/1311/1311.4026.pdf.

(Continued)

*Primary Examiner* — Stephen J Yanchuk
(74) *Attorney, Agent, or Firm* — Knobbe, Martens, Olson & Bear, LLP

(57) ABSTRACT

Provided are a composite precursor of a cathode active material, the composite precursor including a cobalt hydroxide and a cobalt oxyhydroxide, where an X-ray diffraction spectrum of the composite precursor has a first peak observed at a diffraction angle (2θ) of 19.5°±0.5° and a second peak observed at a diffraction angle (2θ) of 38.5°±0.5°; a cathode active material prepared from the composite precursor; a cathode and a lithium battery including the composite precursor; and a method of preparing the composite precursor.

9 Claims, 4 Drawing Sheets

(52) U.S. Cl.
CPC ...... *C01P 2004/03* (2013.01); *C01P 2004/61* (2013.01); *C01P 2004/82* (2013.01); *C01P 2006/11* (2013.01); *Y10T 428/2982* (2015.01)

(58) Field of Classification Search
CPC ............ Y10T 428/2982; C01P 2004/82; C01P 2004/03; C01P 2004/61; C01P 2006/11; C01P 2002/72; C01P 2004/51
See application file for complete search history.

(56) References Cited

U.S. PATENT DOCUMENTS

| | | | |
|---|---|---|---|
| 8,895,190 | B2 | 11/2014 | Chang et al. |
| 2006/0263690 | A1* | 11/2006 | Suhara ................. C01G 51/006 429/231.3 |
| 2009/0117471 | A1* | 5/2009 | Grey ..................... C01G 51/50 429/231.95 |
| 2010/0117025 | A1* | 5/2010 | Takeuchi .............. H01M 4/131 252/182.1 |
| 2010/0196761 | A1* | 8/2010 | Tatsumi ................. C01G 51/04 429/223 |
| 2010/0219370 | A1* | 9/2010 | Nakamura ............. B82Y 30/00 252/182.1 |
| 2014/0329147 | A1* | 11/2014 | Mitsumoto ........... H01M 4/505 429/223 |
| 2015/0311512 | A1* | 10/2015 | Paulsen .................. C01G 51/42 429/219 |
| 2016/0006031 | A1* | 1/2016 | Kaseda ................. H01M 4/131 429/223 |

FOREIGN PATENT DOCUMENTS

| | | |
|---|---|---|
| JP | 2002-060225 A | 2/2002 |
| JP | 2002-201028 A | 7/2002 |
| JP | 2005-272213 A | 10/2005 |
| JP | 2009-242135 A | 10/2009 |
| KR | 10-2005-0096235 A | 10/2005 |
| KR | 10-0575555 B1 | 4/2006 |
| KR | 10-0601064 B | 7/2006 |
| KR | 2006-0106884 A | 10/2006 |
| KR | 2007-0082900 A | 8/2007 |
| KR | 2010-0131430 A | 12/2010 |

OTHER PUBLICATIONS

Office Action issued in counterpart Korean patent application No. 10-2014-0040742, dated May 4, 2020.

* cited by examiner

COMPOSITE PRECURSOR OF CATHODE ACTIVE MATERIAL, CATHODE ACTIVE MATERIAL, CATHODE AND LITHIUM BATTERY CONTAINING THE CATHODE ACTIVE MATERIAL, AND METHOD OF PREPARING COMPOSITE PRECURSOR

CROSS-REFERENCE TO RELATED APPLICATION

This application claims the benefit of Korean Patent Application No. 10-2014-0040742, filed on Apr. 4, 2014, in the Korean Intellectual Property Office, the disclosure of which is incorporated herein in its entirety by reference.

BACKGROUND

Field

One or more embodiments relate to a composite precursor of a cathode active material, a cathode active material prepared from the composite precursor, a cathode and a lithium battery including the cathode active material, and a method of preparing a composite precursor.

Description of the Related Art

Some examples of cathode active materials for a lithium battery include a transition metal compound or a lithium transition metal oxide such as $LiNiO_2$, $LiCoO_2$, $LiMn_2O_4$, $LiFePO_4$, $LiNi_xCo_{1-x}O_2$ ($0 \leq x \leq 1$), or $LiNi_{1-x-y}Co_xMn_yO_2$ ($0 \leq x \leq 0.5$ and $0 \leq y \leq 0.5$).

One example cathode active material is a lithium cobalt oxide ($LiCoO_2$, LCO). A conventional lithium cobalt oxide is prepared by mixing and heat-treating a cobalt oxide ($Co_3O_4$) extracted from raw ore with a lithium compound, such as $Li_2CO_3$. An amount of cobalt and distribution of particle sizes of the lithium cobalt oxide prepared in this manner may be difficult to be controlled, and thus stable electrochemical characteristics may not be provided from the cathode active material.

Thus, a method of producing a cobalt oxide after preparing a cobalt precursor with uniform cobalt contents and particle sizes has been studied. For example, a cobalt oxide may be prepared from a cobalt hydroxide ($Co(OH)_2$), which is a cobalt precursor.

A cobalt hydroxide has a theoretical tap density of 4 g/cm$^3$ or higher. However, when the cobalt hydroxide is practically prepared in the art, a tap density of the prepared cobalt hydroxide is 1.5 g/cm$^3$ or lower. Energy density of a lithium battery including a lithium cobalt oxide prepared from the cobalt hydroxide is still insufficient compared to a theoretical energy density.

SUMMARY

One or more embodiments include a novel high-density composite precursor of a cathode active material.

One or more embodiments include a cathode active material prepared from the composite precursor of a cathode active material.

One or more embodiments include a cathode including the cathode active material.

One or more embodiments include a lithium battery including the cathode.

One or more embodiments include a method of preparing the composite precursor of a cathode active material.

Additional aspects will be set forth in part in the description which follows and, in part, will be apparent from the description, or may be learned by practice of the presented embodiments.

According to an embodiment, a composite cathode active material precursor includes a cobalt hydroxide and a cobalt oxyhydroxide, wherein an XRD spectrum of the precursor has a first peak shown at a diffraction angle (2θ) of 19.5°±0.5° and a second peak shown at a diffraction angle (2θ) of 38.5°±0.5°.

According to an embodiment, a cathode active material includes a lithium cobalt oxide prepared from the composite cathode active material precursor.

According to an embodiment, a lithium battery includes the cathode.

According to an embodiment, a method of preparing a composite cathode active material precursor, the method includes mixing a solution including a transition metal source and a solution including a reducing agent to prepare a mixture and obtain a precipitate from the mixture.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
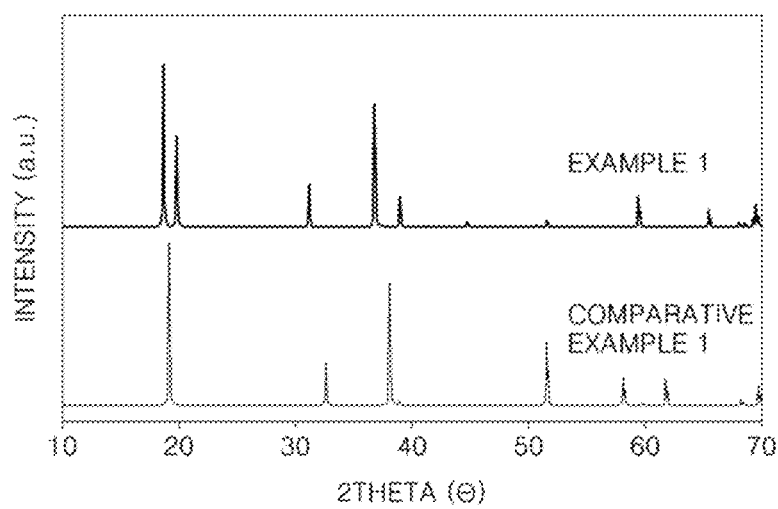
FIG. 1 is an X-ray diffraction (XRD) spectrum of composite cathode active material precursors prepared in Example 1 and Composite Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of" when preceding a list of elements, modify the entire list of elements and do not modify the individual elements of the list.

Hereinafter, a composite precursor of a cathode active material, a cathode active material, a cathode and a lithium battery including the cathode active material, and a method of preparing a composite precursor, according to one or more embodiments, will be described in detail.

According to an embodiment, a composite precursor of a cathode active material (hereinafter, the composite precursor of a cathode active material may also be referred to as "a composite cathode active material precursor") includes a cobalt hydroxide and a cobalt oxyhydroxide, where a first peak is observed at a diffraction angle (2θ) of 19.5°±0.5° and a second peak is observed at a diffraction angle of (2θ) of 38.5°±0.5° in an X-ray diffraction (XRD) spectrum of the composite cathode active material precursor.

The composite cathode active material precursor may have an improved theoretical density by including a cobalt hydroxide and a cobalt oxyhydroxide at the same time. Thus, a mixture density of a cathode including the composite precursor may increase, and, as a result, an energy density of a lithium battery including the cathode may increase. Also, output characteristics and charging/discharging characteristics of the lithium battery may improve.

The theoretical density of cobalt hydroxide ($Co(OH)_2$) is greater than 4 g/cc. However, the theoretical density of cobalt oxyhydroxide (CoOOH) is greater than 5 g/cc. The bond length between cobalt ($Co^{3+}$) and oxygen ($O^{2-}$) of cobalt oxyhydroxide is shorter than that of the bond length between cobalt ($Co^{2+}$) and oxygen ($O^{2-}$) of cobalt hydroxide since a bonding strength between cobalt ($Co^{3+}$) and oxygen ($O^{2-}$) of cobalt oxyhydroxide is stronger than a bonding strength between cobalt ($Co^{2+}$) and oxygen ($O^{2-}$) of cobalt hydroxide. In this regard, the packing ratio of cobalt oxyhydroxide increases as the distance between layers of elements therein decreases, and thus a density of the cobalt oxyhydroxide increases since the number of elements increases in the same unit space. Therefore, a theoretical density of the composite cathode active material precursor may increase by including a cobalt oxyhydroxide in addition to a cobalt hydroxide.

In the XRD spectrum of the composite precursor, the first peak may be derived from cobalt oxyhydroxide (CoOOH), and the second peak may be derived from cobalt hydroxide ($Co(OH)_2$). The composite cathode active material precursor is a composite precursor including a composite phase that includes both a crystalline phase including cobalt hydroxide and a crystalline phase including cobalt oxyhydroxide.

Also, in the XRD spectrum of the composite precursor, an intensity ratio ($I_2/I_1$) of an intensity ($I_2$) of the second peak to a first intensity ($I_1$) of the first peak may be about 0.30 or higher. For example, in the XRD spectrum of the composite precursor, an intensity ratio ($I_2/I_1$) of the second peak to the first peak may be about 0.30 to about 1.0. For example, in the XRD spectrum of the composite precursor, an intensity ratio ($I_2/I_1$) of the second peak to the first peak may be from about 0.30 to about 0.80.

A tap density of the composite cathode active material precursor may be 1.6 g/cm$^3$ or greater by including the composite phase. For example, a tap density of the composite precursor may be from about 1.6 g/cm$^3$ to about 3.5 g/cm$^3$. For example, a tap density of the composite precursor may be from about 2.0 g/cm$^3$ to about 3.5 g/cm$^3$. When the composite precursor has a tap density within the ranges above, a cathode plate prepared by using the composite precursor may have an improved mixture density. Therefore, a lithium battery including the cathode plate may have an improved energy density.

A primary particle of the composite cathode active material precursor may have a spherical sphere. The composite cathode active material precursor may have primary particles that are spherical rather than having a flake-like shape or a needle-like shape. The primary particles having a spherical sphere may have a sphericity of about 0.7 or higher. The sphericity may be calculated by using a circularity of a two dimensional (2D) projection of the particles (a circularity=a circumference of a circle having the same area with the 2D projection/a circumference of the 2D projection).

When a composite precursor has non-spherical particles, a lithium cobalt oxide prepared by reacting the composite precursor and a lithium compound may have a high residual lithium content irregular particle sizes. Thus, the life characteristics and an electrode plate density of a lithium battery, including the lithium cobalt oxide, may degrade.

A cathode active material prepared using the composite cathode active material precursor and a lithium precursor, such as a lithium carbonate, may have a composition ratio of Li/Me of about 1.00. Thus, the cathode active material may have a reduced residual lithium content and uniform particle size distribution. The cathode active material may be, for example, a lithium cobalt oxide ($LiCoO_2$).

An average particle diameter of the primary particles of the composite cathode active material precursor may be about 1 μm or less. For example, as shown in an SEM image of FIG. 3A, an average particle diameter of the primary particles of the composite cathode active material precursor may be from about 10 nm to about 1 μm. Also, when the primary particles are combined/coagulated, second particles may be formed as shown in an SEM image of FIG. 3B.

An average particle diameter (D50) of secondary particles of the composite cathode active material precursor may be from about 10 μm to about 20 μm. For example, an average particle diameter (D50) of secondary particles of the composite cathode active material precursor may be from about 12 μm to about 15 μm. When an average particle diameter of the secondary particles of the composite cathode active material precursor is less than 10 μm, the secondary particles are sintered excessively during a reaction with lithium carbonate ($Li_2CO_3$) in comparison with the secondary particles having an average particle diameter of 10 μm or greater but the same Li/Me ratio, thus the life characteristics of a lithium battery may be deteriorated. Further, when an average particle diameter of the secondary particles of the composite cathode active material precursor is greater than 20 μm, an electrode density may decrease and output characteristics of lithium battery may be degraded due to empty space between the secondary particles of the cathode active material, which is derived from the secondary particles of composite precursor. In this regard, a lithium battery having an improved density may be obtained within these averages particle diameter range of the secondary particles of composite precursor.

According to another embodiment, a cathode active material includes a lithium cobalt oxide ($LiCoO_2$) prepared from the composite cathode active material precursor.

For example, the lithium cobalt oxide is prepared by heating the composite cathode active material precursor to prepare a cobalt oxide and by mixing and sintering the cobalt oxide and a lithium compound.

The cobalt oxide may be obtained by heat-treating a composite cobalt precursor, where any material available as a cobalt oxide in the art may be used. The cobalt oxide may be, for example, $Co_3O_4$.

The lithium compound may be any compound available as a lithium source in the art to prepare a lithium oxide. For example, the lithium compound may be $Li_2CO_3$.

A temperature at which the heating is performed is not particularly limited and may be from about 700° C. to about 900° C. For example, the heating may be performed at a temperature from about 700° C. to about 850° C. When a temperature of the heating is lower than 700° C., the composite cathode active material precursor may not be sufficiently oxidized. When a temperature of the heating is higher than 900° C., a particle diameter of the resulting cobalt oxide may excessively increase, and thus additional processes, such as pulverization, may be needed. The heating may be performed in an oxidizing atmosphere. For example, the oxidizing atmosphere, in which the heating is performed, may be an atmosphere including oxygen. The heating may be performed for about 5 hours to about 10 hours, but is not limited thereto, and a period of time for the heating may be appropriately selected.

A temperature at which the sintering is performed is not particularly limited and may be from about 800° C. to about 1200° C. For example, the sintering may be performed at a temperature from about 950° C. to about 1100° C. When a temperature of the sintering is lower than 800° C., the lithium source may not be sufficiently melted, and thus a lithium cobalt oxide may not have a homogenous composition, and when a temperature of the sintering is higher than 1200° C., lithium may rapidly vaporize, and thus it may be difficult to maintain a molar ratio of lithium and cobalt at 1:1. The sintering may be performed in an oxidizing atmosphere. For example, the oxidizing atmosphere in which the sintering is performed may be an atmosphere including oxygen. The sintering may be performed for about 5 hours to about 10 hours, but is not limited thereto, and a period of time for the sintering may be appropriately selected.

According to another embodiment, a cathode may include a cathode active material including the lithium cobalt oxide and may have a mixture density of 4.06 g/cm³ or greater. For example, a mixture density of the cathode may be 4.07 g/cm³ or greater. For example, a mixture density of the cathode may be 4.08 g/cm³ or greater. For example, a mixture density of the cathode may be 4.09 g/cm³ or greater. For example, a mixture density of the cathode may be 4.10 g/cm³ or greater. For example, a mixture density of the cathode may be 4.15 g/cm³ or greater. For example, a mixture density of the cathode may be 4.20 g/cm³ or greater. For example, a composite density of the cathode may be 4.30 g/cm³ or greater. An energy density of a lithium battery including the cathode may increase as a mixture density of the cathode is 4.06 g/cm³ or greater.

For example, the cathode may be prepared by using the following method:

First, the above-mentioned lithium cobalt oxide, a conducting agent, a binding agent, and a solvent are mixed to prepare a cathode active material composition. The cathode active material composition may be coated directly on an aluminum current collector and dried to prepare a cathode electrode plate on which a cathode active material layer is formed. Alternatively, the cathode active material composition may be cast on a separate support to form a cathode composition film, which is then peeled from the separate support and laminated on an aluminum current collector to prepare a cathode plate with a cathode active material layer formed thereon.

Examples of the conducting agent include carbon black, graphite particulates, natural graphite, artificial graphite, acetylene black, ketjen black, and carbon fibers; carbon nanotubes; metal powder, metal fibers, or metal tubes of copper, nickel, aluminum, or silver; and a conductive polymer such as polyphenylene derivatives, but the conducting agent is not limited thereto, and any conducting agent available in the art may be used.

Examples of the binder include a vinylidene fluoride/hexafluoropropylene copolymer, polyvinylidene fluoride (PVDF), polyacrylonitrile, polymethyl methacrylate, polytetrafluoroethylene, mixtures thereof, and a styrene butadiene rubber polymer. Examples of the solvent include N-methyl-pyrrolidone (NMP), acetone, and water. However, the binder and the solvent are not limited thereto, and any material available for these purposes in the art may be used.

Alternatively, a plasticizer may be further added to the cathode active material composition to form a cathode plate with pores.

The amounts of the composite cathode active material, the conducting agent, the binder, and the solvent are those that are generally used in the manufacture of a lithium battery. At least one selected from the group consisting of the conducting agent, the binder, and the solvent may not be used according to the use and the structure of the lithium battery.

In another embodiment, the cathode may further include a conventional cathode active material that is different from the lithium cobalt oxide in terms of at least one selected from the group consisting of its composition, preparation method, and properties, in addition to the composite cathode active material.

The conventional cathode active material may be any one available in the art, for example, may be a lithium-containing metal oxide. For example, at least one of lithium composite oxides with metals selected from among cobalt, manganese, nickel, and a combination thereto may be used. Examples of lithium metal oxides are compounds represented by the following formulas: $Li_aA_{1-b}B_bD_2$ (where, $0.90 \le a \le 1$ and $0 \le b \le 0.5$); $Li_aE_{1-b}B_bO_{2-c}D_c$ (where, $0.90 \le a \le 1$, $0 \le b \le 0.5$, and $0 \le c \le 0.05$); $LiE_{2-b}B_bO_{4-c}D_c$ (where, $0 \le b \le 0.5$ and $0 \le c \le 0.05$); $Li_aNi_{1-b-c}Co_bB_cD_\alpha$ (where, $0.90 \le a \le 1$, $0 \le b \le 0.5$, $0 \le c \le 0.05$, and $0 < \alpha \le 2$); $Li_aNi_{1-b-c}Co_bB_cO_{2-\alpha}F_\alpha$ (where, $0.90 \le a \le 1$, $0 \le b \le 0.5$, $0 \le c \le 0.05$, and $0 < \alpha \le 2$); $Li_aNi_{1-b-c}Co_bB_cO_{2-\alpha}F_2$ (where, $0.90 \le a \le 1$, $0 \le b \le 0.5$, $0 \le c \le 0.05$, and $0 < \alpha < 2$); $Li_aNi_{1-b-c}Mn_bB_cD_\alpha$ (where, $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}F_\alpha$ (where, $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (where, $0.90 \le a \le 1$, $0 \le b \le 0.5$, $0 \le c \le 0.05$, and $0 < \alpha < 2$); $Li_aNi_bE_cG_dO_2$ (where, $0.90 \le a \le 1$, $0 \le b \le 0.9$, $0 \le c \le 0.5$, and $0.001 \le d \le 0.1$); $Li_aNi_bCo_cMn_dGeO_2$ (where, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1$ and $0.001 \le b \le 0.1$); $Li_aCoG_bO_2$ (where, $0.90 \le a \le 1$ and $0.001 \le b \le 0.1$); $Li_aMnG_bO_2$ (where, $0.90 \le a \le 1$ and $0.001 \le b \le 0.1$); $Li_aMn_2G_bO_4$ (where, $0.90 \le a \le 1$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where, $0 \le f \le 2$); $Li_{(3-f)}Fe_2(PO_4)_3$ (where, $0 \le f \le 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

Examples of the cathode active material are $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ (0≤x≤0.5, 0≤y≤0.5), and $FePO_4$.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from the group consisting of oxide, hydroxide, oxyhydroxide, oxycarbonate, and hydroxycarbonate of the coating element. These compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. This is known to those skilled in the art, and thus a detailed description thereof will be omitted.

One or more embodiments include a lithium battery including the cathode. The lithium battery may be manufactured in the following manner:

First, a cathode is prepared according to the above-described cathode formation method.

Next, an anode may be manufactured as follows: The anode may be manufactured in the same manner as the cathode, except for using an anode active material, instead of the composite cathode active material. A conducting agent, a binder, and a solvent used to prepare an anode active material composition may be the same as those used in the cathode active material composition.

For example, an anode active material, a conducting agent, a binder, and a solvent are mixed to prepare an anode active material composition, which is then coated directly on a copper current collector, thereby manufacturing an anode plate. Alternatively, the anode active material composition may be cast on a separate support, and then an anode active material film separated from the support may be laminated on a copper current collector to prepare an anode plate.

The anode active material may be any anode active material for a lithium battery available in the art. For example, the anode active material may include at least one selected from the group consisting of lithium metal, a metal that is alloyable with lithium, a transition metal oxide, a non-transition metal oxide, and a carbonaceous material.

Examples of the metal alloyable with lithium include Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof, except for Si), and a Sn—Y alloy (where Y is an alkali metal, an alkali earth metal, a Group XIII element, a Group XIV element, a transition metal, a rare earth element, or a combination thereof, except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Examples of the transition metal oxide are a lithium titanium oxide, a vanadium oxide, and a lithium vanadium oxide.

Examples of the non-transition metal oxide include $SnO_2$ and $SiO_x$ (0<x<2).

Examples of the carbonaceous material are crystalline carbon, amorphous carbon, and mixtures thereof. Examples of the crystalline carbon are graphite, such as natural graphite or artificial graphite that is in amorphous, plate, flake, spherical or fibrous form. Examples of the amorphous carbon include soft carbon (carbon sintered at low temperatures), hard carbon, mesophase pitch carbides, and sintered corks.

The amounts of the cathode electrode active material, the conducting agent, the binder, and the solvent are those that are generally used in the manufacture of a lithium battery.

A separator to be disposed between the cathode and the anode is prepared. The separator for the lithium battery may be any separator that is commonly used in lithium batteries. The separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and combinations thereof, each of which may be a non-woven or woven fabric. For example, a rollable separator, including polyethylene or polypropylene, may be used for a lithium ion battery. A separator with a good organic electrolyte solution-retaining ability may be used for a lithium ion polymer battery. For example, the separator may be manufactured in the following manner:

A polymer resin, a filler, and a solvent may be mixed together to prepare a separator composition. The separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin include a vinylidenefluoride/hexafluoropropylene copolymer, PVDF, polyacrylonitrile, polymethyl methacrylate, and mixtures thereof.

An electrolyte is prepared.

For example, the electrolyte may be an organic electrolyte solution. Alternately, the electrolyte may be in a solid phase. Non-limiting examples of the electrolyte include lithium oxide and lithium oxynitride. Any material available as a solid electrolyte in the art may be used. The solid electrolyte may be formed on the anode by, for example, sputtering.

In some embodiments, an organic electrolyte solution may be prepared as follows: The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, and mixtures thereof.

The lithium salt may be any material available as a lithium salt in the art. Non-limiting examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are natural numbers), LiCl, LiI, and mixtures thereof.

Figure 4:
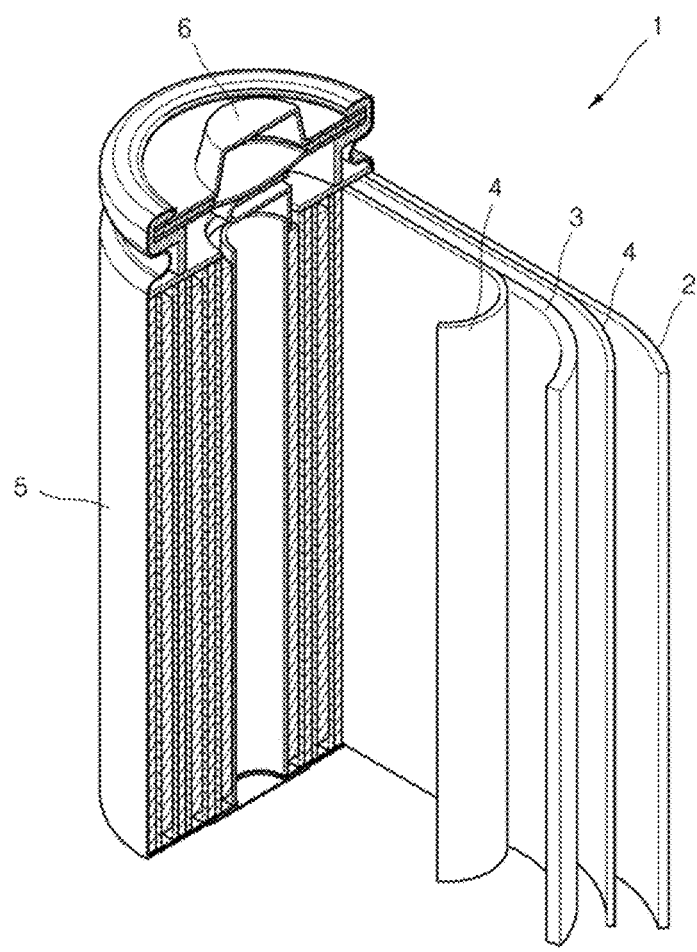
FIG. 4 is a schematic view of a lithium battery according to an embodiment.

Referring to FIG. 4, a lithium battery 1 according to an embodiment includes a cathode 3, an anode 2, and a separator 4. The cathode 3, the anode 2, and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical type, a rectangular type, or a thin-film type battery case. For example, the lithium battery 1 may be a thin-film type battery. The lithium battery 1 may be a lithium ion battery.

A separator may be interposed between a cathode and an anode to form a battery assembly. Alternatively, the battery assembly may be stacked in a bi-cell structure and impregnated with an electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smartphone, an electric vehicle, and the like.

The lithium battery may have an improved lifetime and high rate characteristics, and thus may be applicable to an electric vehicle (EV), for example, in a hybrid vehicle such as plug-in hybrid electric vehicle (PHEV). The lithium battery may be applicable to the high-power storage field, for example, to an electric bicycle, a power tool, and the like.

According to another embodiment, a method of preparing a composite cathode active material precursor includes mixing a solution including a transition metal source and a solution including a reducing agent to obtain a precipitate from the mixture solution.

Conventionally, when a method of preparing a cathode active material precursor is carried out by using a co-precipitation method, oxidation conditions are needed to obtain a precipitate (for example, CoOOH) of a composite hydroxide having a high density. However, under oxidation conditions, particle growth of the composite hydroxide is suppressed. Therefore, in order to obtain particles of the composite cathode active material precursor having a high density while a particle diameter is 15 μm or greater, a small amount of a reducing agent may be used in the method for the particle diameter growth in addition to forming the oxidation conditions, and thus an enhanced density and an enhanced particle diameter of the composite oxide may be simultaneously achieved.

The reducing agent may be an organic reducing agent. When an inorganic reducing agent including a metal element is used as a reducing agent, resulting composite cathode active material precursor includes other metals derived from the inorganic reducing agent as impurities. Accordingly, a lithium cobalt oxide obtained from the composite precursor includes other metals as impurities, and thus physical properties of a lithium battery including the lithium cobalt oxide may degrade. An organic reducing agent may be mostly or completely thermal-decomposed and eliminated during a process of preparing a lithium cobalt oxide. The organic reducing agent is not particularly limited, and any organic compound with a reducing strength available in the art may be used. The organic reducing agent may be an organic compound that does not include metal elements. The organic reducing agent may be, for example, an organic compound capable of producing hydride ions ($H^-$).

In the method, the reducing agent may be a reducing sugar. The reducing sugar has a mild reducing strength and thus may suppress oxidation of a transition metal. The reducing sugar is a sugar that has an aldehyde group within a molecule or that may form an aldehyde group in an aqueous solution. For example, the reducing agent may be at least one selected from the group consisting of glucose, glyceraldehyde, galactose, lactose, maltose, and fructose, but the reducing agent is not limited thereto, and any reducing sugar available in the art may be used.

In the method, the pH of the mixture solution may be from about 9 to about 11. When the pH of the mixture solution is lower than 9, a particle diameter of the composite cathode active material precursor increases excessively, and thus an additional pulverization process is needed. When the pH of the mixture solution is higher than 11, a particle diameter of the composite cathode active material precursors decreases excessively, and thus an appropriate filtration of the particles may be difficult.

In the method, the transition metal source may be a sulfoxide of a transition metal, a nitrate of a transition metal, an acetate of a transition metal, a chloride of a transition metal, a phosphate of a transition metal, or a mixture thereof, but the transition metal source is not limited thereto, and any compound available in the art as a source of a transition metal may be used.

In the method, the mixture solution may additionally include a complexing agent. A material of the complexing agent is not particularly limited as long as the cathode active material may bond with a transition metal ion in the mixture solution and form a chelate. For example, the complexing agent may be aqueous ammonia, ammonium sulfate, ammonium hydrochloride, ammonium carbonate, ammonium fluoride, or ethylenediamine acetic acid.

In the method, the pH of the mixture solution may be controlled by using a pH controlling agent. For example, the pH controlling agent may be a sodium hydroxide or a potassium hydroxide.

In the method, a molar ratio of the transition metal source and the reducing agent in the mixture solution may be from about 1:0.01 to about 1:0.06. In the mixture solution, when a molar ratio of the transition metal source and the reducing agent is within this range, a density of the precipitate may increase.

Hereinafter, the present embodiments will be described in more detail with reference to the following examples and comparative examples. However, the following examples and comparative examples are provided for illustrative purposes only, and the scope of the present embodiments should not be limited thereto in any manner.

Preparation of Composite Cathode Active Material Precursor

Example 1

8 L of distilled water was added to a 10 L reactor equipped with a stirrer and an overflow pipe and then stirred at a rate of about 500 rpm while maintaining a temperature of the reactor at about 70° C.

A cobalt sulfate aqueous solution at a concentration of 2.4 M, a NaOH solution at a concentration of 4.80 M as a pH controller, and a glucose solution at a concentration of 0.048 M as a reducing agent were added to the reactor, and the pH of the reaction solution was maintained from about 9 to about 10. Oxygen ($O_2$) was provided from a bottom of the reactor for maintaining an oxidation atmosphere. A molar ratio of cobalt sulfate and glucose in the reactor was maintained at 1:0.02. An average residence time of the reaction solution in the reactor was controlled to be 14 hours by controlling a flow rate, and after the reaction reached a steady state, a solution including a composite cathode active material precursor was continuously obtained through the overflow pipe.

From the solution including the composite cathode active material precursor, the composite cathode active material precursor was collected, washed, filtered, and then dried in a hot air dryer at a temperature of 100° C. for 24 hours to obtain a composite cathode active material precursor (a composite of a cobalt hydroxide and a cobalt oxyhydroxide).

Figure 3A:
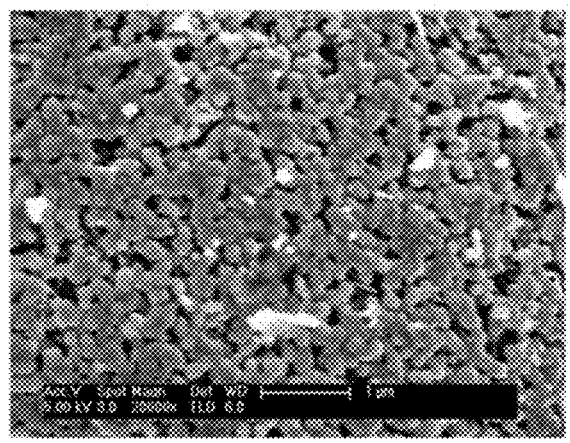
FIG. 3A is an SEM image of primary particles of the composite cathode active material precursor prepared in Example 1.
Figure 3B:
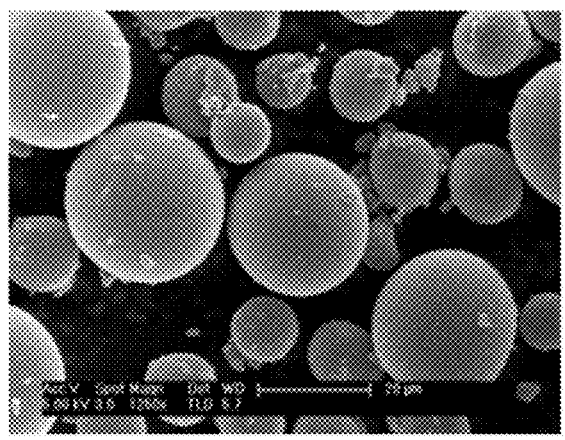
FIG. 3B is an SEM image of secondary particles of the composite cathode active material precursor prepared in Example 1.

SEM images of the composite cathode active material precursor thus obtained are shown in FIGS. 3A and 3B. As shown in FIG. 3A, an average particle diameter of primary particles is from about 10 nm to about 20 nm. As shown in FIG. 3A, the primary particles are spherical. 3

Example 2

A composite cathode active material precursor was prepared in the same manner as in Example 1, except that a concentration of glucose in the reducing agent was changed to 0.024 M.

Example 3

A composite cathode active material precursor was prepared in the same manner as in Example 1, except that a concentration of glucose in the reducing agent was changed to 0.096 M.

Example 4

A composite cathode active material precursor was prepared in the same manner as in Example 1, except that a concentration of glucose in the reducing agent was changed to 0.144 M.

Example 5

A composite cathode active material precursor was prepared in the same manner as in Example 1, except that the reducing agent was changed to sucrose.

Example 6

A composite cathode active material precursor was prepared in the same manner as in Example 1, except that the reducing agent was changed to lactose.

Comparative Example 1

8 L of distilled water was added to a 10 L reactor equipped with a stirrer and an overflow pipe and then stirred at a rate of about 500 rpm while maintaining a temperature of the reactor at about 45° C.

A cobalt sulfate aqueous solution at a concentration of 2.4 M and a NaOH solution at a concentration of 4.80 M as a pH controller were added to the reactor, and the pH of the reaction solution was maintained from about 10 to about 11. Nitrogen ($N_2$) was provided from a bottom of the reactor for maintaining an inert atmosphere. An average residence time of the reaction solution in the reactor was controlled to be 14 hours by controlling a flow rate, and after the reaction reached a steady state, a solution including a composite cathode active material precursor was continuously obtained through the overflow pipe.

From the solution including the composite cathode active material precursor, the composite cathode active material precursor was collected, washed, filtered, and then dried in a hot air dryer at a temperature of 100° C. for 24 hours to obtain a composite cathode active material precursor (such as a cobalt hydroxide).

Figure 2A:
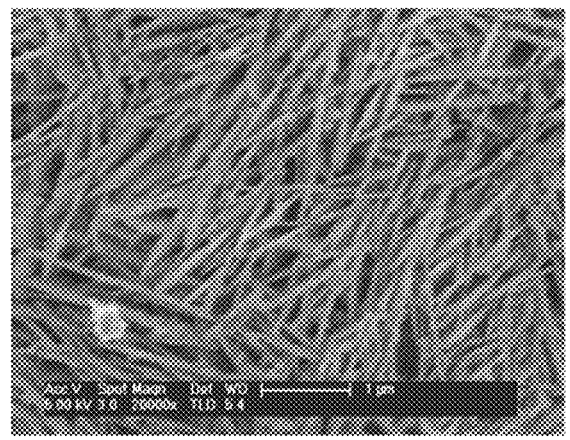
FIG. 2A is a scanning electron microscope (SEM) image of primary particles of the composite cathode active material precursor prepared in Comparative Example 1.
Figure 2B:
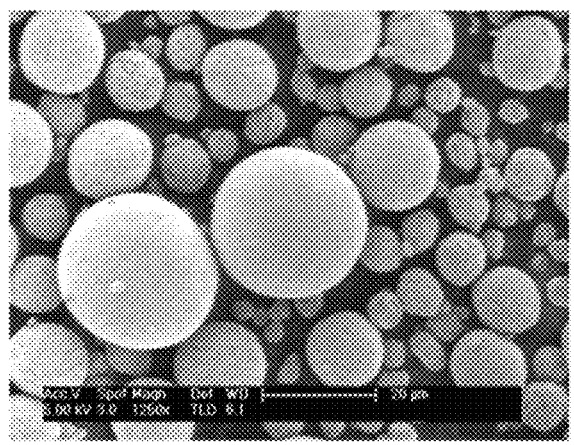
FIG. 2B is an SEM image of secondary particles of the composite cathode active material precursor prepared in Comparative Example 1.

SEM images of the single phase composite cathode active material precursor thus obtained are shown in FIGS. 2A and 2B. As shown in FIG. 2A, primary particles have a flake-like shape.

Preparation of Cathode Active Material

Example 7

Composite cathode active material precursor dry powder prepared from Example 1 was added to a furnace or kiln and heated to a temperature of 800° C. for 5 hours in the air to obtain a cobalt oxide ($Co_3O_4$).

The cobalt oxide and a lithium carbonate ($Li_2CO_3$) were mixed to have a molar ratio of cobalt and lithium of 1:1.02, and then the mixture was sintered at a temperature of 1050° C. for 8 hours in the air to prepare a cathode active material represented by $LiCoO_2$.

Examples 8 to 12

Cathode active materials were prepared in the same manner as in Example 7, except that composite cathode active material dry powders prepared from Examples 2 to 6 were each respectively used.

Comparative Example 2

A cathode active material was prepared in the same manner as in Example 7, except that composite cathode active material dry powder prepared from Comparative Example 1 was used.

Comparative Example 3

A separately obtained cobalt oxide ($Co_3O_4$, Reshine RPC-31) and a lithium carbonate ($Li_2CO_3$) were mixed to have a molar ratio of cobalt and lithium of 1:1.02, and then the mixture was sintered at a temperature of 1050° C. for 8 hours in the air to prepare a cathode active material represented by $LiCoO_2$.

Preparation of Cathode and Lithium Battery

Example 13

A cathode active material ($LiCoO_2$) powder prepared from Example 7 and a carbon conducting agent (Super-P, available from Timcal Ltd.) were homogenously mixed at a weight ratio of 95:2, and then a PVDF binder solution was added thereto to prepare a slurry including an active material:a carbon conducting agent:a binder at a weight ratio of 95:2:3.

The slurry was coated and dried on an aluminum foil with a thickness of about 15 μm to prepare a cathode plate.

The cathode plate was additionally vacuum-dried and used in preparation of a coin cell (CR2016 type) with a diameter of 12 mm.

In the cell preparation, a metal lithium as a counter electrode, a polypropylene separator (Celgard 3501) as a separator, and a solution in which 1.3 M $LiPF_6$ was dissolved in a mixed solvent of ethylene carbonate (EC) and diethylcarbonate (DEC) at a volume ratio of 3:7 as an electrolyte was used respectively.

Examples 14 to 18

Lithium batteries were manufactured in the same manner as in Example 13, except that the cathode active materials ($LiCoO_2$) prepared in Examples 8 to 12 were respectively used.

Comparative Examples 4 and 5

Lithium batteries were manufactured in the same manner as in Example 13, except that the cathode active materials ($LiCoO_2$) prepared in Examples 2 and 3 were respectively used.

Evaluation Example 1

XRD Measurement

XRD spectrums of the composite cathode active material precursors prepared in Example 1 and Comparative Example 1 were obtained, and some of the results are shown in Table 1 below. The instrument used in obtaining the XRD spectrums was model no. sdik-j1-066 from Philips. An X-ray source was a Cu kα ray at 8048 eV.

As shown in FIG. 1, the composite cathode active material precursor prepared in Example 1 had a first peak observed at a diffraction angle (2θ) of 19.5°±0.5° and a second peak observed at a diffraction angle (2θ) of 38.5°±0.5°. The first peak corresponds to $Co(OH)_2$, and the second peak corresponds to CoOOH. Accordingly, it was confirmed that the composite cathode active material precursor has a composite phase of $Co(OH)_2$ and CoOOH.

Only a peak corresponding to $Co(OH)_2$ was observed for the composite cathode active material precursor prepared in Comparative Example 1.

Evaluation Example 2

Average Particle Diameter (D50) Measurement

Average particle diameters (D50) of the secondary particles of the composite cathode active material precursors prepared in Examples 1 to 6 and Comparative Example 1 were measured, and some of the results are shown in Table 1 below. The average particle diameters were measured by using a laser diffraction scattering-type particle diameter distribution measuring device (BECKMAN COULTER, LS 3Series).

TABLE 1

|  | Average particle diameter (D50) [μm] |
|---|---|
| Example 1 | 15 |
| Comparative Example 1 | 15 |

As shown in Table 1, the composite cathode active material precursor prepared in Example 1 had an average particle diameter within the range of about 12 μm to about 15 μm (more widely, from about 10 μm to about 20 μm). The other Examples except that Example 1 also showed the similar results with the composite cathode active material precursor prepared in Example 1.

Evaluation Example 3

Tap Density Measurement

A tap density was measured by filling 50 cc of a cathode active material precursor powder in a 100 cc mass cylinder, performing 1000 times of tapping that oscillates to a height of 3 mm every second, and dividing a mass by a volume.

In this regard, tap densities of the cathode active material precursors prepared in Examples 1 to 6 and Comparative Example 1 were measured, and some of the results are shown in Table 2 below.

TABLE 2

|  | Tap density[g/cc] |
|---|---|
| Example 1 | 2.85 |
| Example 2 | 2.27 |
| Example 3 | 2.63 |
| Example 4 | 2.49 |
| Example 5 | 2.23 |
| Example 6 | 2.30 |
| Comparative Example 1 | 1.41 |

As shown in Table 2, the composite cathode active material precursors prepared in Examples 1 to 6 had tap densities that significantly increased compared to that of the single phase cathode active material precursor prepared in Comparative Example 1.

Evaluation Example 4

Mixture Density Measurement

The cathode active material layers formed on cathode plates prepared in Examples 13 to 18 and Comparative Examples 4 and 5 were pressed and cut into a size of 30 mm×30 mm, and a thickness and a weight of each of the pressed layers were measured to obtain a mixture density.

The measured composite densities are shown in Table 3.

TABLE 3

|  | Mixture density [g/cc] |
|---|---|
| Example 13 | 4.13 |
| Example 14 | 3.98 |

TABLE 3-continued

| | Mixture density [g/cc] |
|---|---|
| Example 15 | 4.05 |
| Example 16 | 4.05 |
| Example 17 | 4.00 |
| Example 18 | 4.02 |
| Comparative Example 4 | 3.96 |
| Comparative Example 5 | 3.98 |

As shown in Table 3, the mixture densities of the cathodes prepared in Examples 13 to 18 were increased in comparison with that of the cathodes prepared in Comparative Examples 4 and 5.

Evaluation Example 5

Evaluation of Charging/Discharging Characteristics

At a temperature of 25° C., the coin cells prepared in Examples 13 to 18 and Comparative Examples 4 and 5 were charged with a constant current of 0.1 C to a voltage of 4.4 V (vs. Li/Li$^+$), and then the coin cells were discharged with a constant current of 0.1 C to a voltage of 3.0 V (vs. Li/Li$^+$).

Subsequently, at a temperature of 25° C., the lithium battery was charged with a constant current of 0.2 C to a voltage of 4.4 V (vs. Li/Li$^+$), and then the coin cells were discharged with a constant current of 0.2 C to a voltage of 3.0 V (vs. Li/Li$^+$) (a formation process).

At a temperature of 25° C., the lithium battery, which has been subjected to the formation process, was charged with a constant current of 0.5 C to a voltage of 4.4 V (vs. Li/Li$^+$), and then the coin cells were discharged with a constant current of 0.5 C to a voltage of 3.0 V (vs. Li/Li$^+$), and a cycle including charging and discharging was repeated 30 times.

Some of the charging/discharging test results are shown in Table 4. A capacity retention rate denoting life characteristics is represented by Equation 1.

Capacity retention rate[%]=[a discharge capacity after 30$^{th}$ cycle(0.5 C discharge)/a discharge capacity after 1$^{st}$ cycle(0.5 C discharge)]×100    <Equation 1>

TABLE 4

| | Discharge capacity after 30$^{th}$ cycle [mAh/cc] |
|---|---|
| Example 13 | 722.75 |
| Example 14 | 656.70 |
| Example 15 | 660.15 |
| Example 16 | 648.05 |
| Example 17 | 700.65 |
| Example 18 | 703.50 |
| Comparative Example 4 | 621.72 |
| Comparative Example 5 | 628.84 |

As shown in Table 4, the lithium batteries prepared in Examples 13 to 18 had improved energy densities, compared to those of the lithium batteries prepared in Comparative Examples 4 and 5.

Further, the lithium batteries prepared in Examples 13 to 18 provided life characteristics similar to those of the lithium batteries prepared in Comparative Examples 4 and 5.

As described above, according to the one or more of the above embodiments, an energy density of a lithium battery may improve by including a novel composite cathode active material precursor.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present embodiments as defined by the following claims.

What is claimed is:

1. A composite cathode active material precursor having spherical primary particles and secondary particles, comprising:
a composite phase comprising a cobalt hydroxide and a cobalt oxyhydroxide,
wherein an XRD spectrum of the precursor has a first doublet peak corresponding to the cobalt oxyhydroxide at a diffraction angle (2θ) of 19.5°±1.0° and a second peak corresponding to the cobalt hydroxide at a diffraction angle (2θ) of 38.5°±0.5°,
wherein an average particle diameter of the spherical primary particles of the composite cathode active material precursor is about 1 μm or less,
wherein the tap density of the composite cathode active material precursor is greater than 2.0 g/cm$^3$, and
wherein the spherical primary particles have a sphericity, calculated using circularities of two dimensional projections of the spherical primary particles, of about 0.7 or higher.

2. The composite cathode active material precursor of claim 1, wherein an average particle diameter (D50) of secondary particles of the composite cathode active material precursor is from about 10 μm to about 20 μm.

3. The composite cathode active material precursor of claim 1, wherein an average particle diameter (D50) of secondary particles of the composite cathode active material precursor is from about 12 μm to about 15 μm.

4. A method of preparing a composite cathode active material precursor, the method comprising mixing a solution comprising a transition metal source and a solution comprising a reducing agent to prepare a mixture and obtain a precipitate from the mixture, thereby providing the composite cathode active material precursor of claim 1.

5. The method of claim 4, wherein the reducing agent is an organic reducing agent.

6. The method of claim 4, wherein the reducing agent is a reducing sugar.

7. The method of claim 4, wherein the reducing agent is at least one selected from the group consisting of glucose, glyceraldehydes, galactose, lactose, maltose, and fructose.

8. The method of claim 4, wherein the pH of the mixture is from about 9 to about 11.

9. The method of claim 4, wherein a molar ratio between the transition metal source and the reducing agent in the mixture is from about 1:0.01 to about 1:0.06.

* * * * *